United States Patent Office 3,282,907
Patented Nov. 1, 1966

3,282,907
POLYMERIZATION CATALYST SYSTEM
AND PROCESS
Robert O. Lindblom, Pleasant Hill, and Joseph B. Byrne, Antioch, Calif., assignors to The Dow Chemical Company, Midland, Mich., a corporation of Delaware
No Drawing. Filed Dec. 3, 1962, Ser. No. 242,849
26 Claims. (Cl. 260—93.7)

This invention relates to improved heterogeneous catalyst systems for polymerizing olefinc compounds. More specifically, it relates to an improved heterogeneous catalyst composition comprising the reaction product of a sodium compound of an alkanolamine with other components, and the process wherein the polymerization of olefinic compounds is effected by such catalyst.

In the solution polymerization of propylene and other olefins, it has been found that with heterogeneous catalyst systems, such as complexes formed from $TiCl_4$ with aluminum alkyls, such as $AlEt_3$, etc., $TiCl_3$ plus $AlEt_3$, etc. there is a substantial portion of amorphous or atactic polymer formed. These atactic polymers have a random polymer structure whereas the desired isotactic type of polymer has a sterospecific type of structure in which the side branches from the linear chain are arranged in a regular repeating type of arrangement which gives desired crystalline structure and resultant desired qualities in the polymer.

The isotactic polymer of propylene, which is a hard, tough material is the desired product. This is high-melting (165°–175° C.), and is a highly crystalline material (65–75% by X-ray determination). It has been noted that as the proportion of atactic polymer is increased the tensile yield and tensile modulus properties of the isotactic polymer composition are adversely affected.

Regardless of the molecular weight of the atactic type of polymer, this amorphous polymer is soluble in xylene. In contrast the isotactic polymer obtained in this type of polymerization is insoluble in xylene. The low molecular weight portion of the atactic polymer resembles grease in nature. The higher molecular weight atactic polymers resemble wax in character. Both types are soluble in xylene, whereas the wax portion of the atactic polymer is insoluble in an equal volume mixture of isopropanol and xylene.

Both of these atactic materials detract from desired properties in the polymer. The grease gives a slippery, undesirable surface property to the polymer in addition to other disadvantages. While substantial amounts of the wax type can be tolerated in these polymers for certain purposes, the Food and Drug Administration has set a limit of 9% where such polymer products are to be used in contact with food, etc.

Since the most economical method of recovering the polymer from the reaction mass is to vaporize the solvent therefrom, this atactic byproduct is left in the isotactic polymer with resultant disadvantageous results on the properties.

Removal of such atactic byproduct by extraction involves extra processing steps which increase the cost of production of the desired polymer. Recovery of the desired isotactic polymer by precipitation, thereby retaining the atactic byproduct in the polymerization solvent, likewise entails additional processing steps and expense. In addition to the increased expense such methods do not give completely satisfactory results.

Therefore, the logical method for avoiding the necessity to remove substantial amounts of atactic polymer, in order to obtain the desired properties in the polymeric olefin, is to avoid the formation of substantial amounts of such atactic material.

A number of catalyst systems have been tried in an attempt to avoid or to reduce to a permissible amount the formation of such atactic polymers as byproducts in the production of the desired isotactic polymeric olefin. While certain catalyst systems give some small decrease in the amount of atactic byproduct, they produce side effects which are almost as disadvantageous, such as a decrease in the yield of polymer. Certain other catalyst systems actually increase the amount of atactic material. In other words, most polymerization catalyst systems either are noneffective in reducing the amount of such byproduct formed or where there is any improvement in this respect, certain other disadvantages result to offset such improvement.

In a copending application filed by applicants the same date herewith, a new catalyst system comprising an alkanolamine is disclosed and claimed. It is also disclosed and claimed in the solution polymerization of olefinic compounds, that the amount of xylene-soluble polymer is reduced by the use of this new catalyst composition.

In accordance with the present invention, a new catalyst composition has been found. It has also now been found that, by the use of this catalyst composition, the proportion of atactic polymer formed in the solution polymerization of propylene, butene-1 and other olefins which normally form substantial amounts of atactic polymer byproduct in heterogenous catalyst systems, can be reduced without any disadvantageous side effects to an amount which is not harmful to the properties of the desired polymer. This new catalyst composition is the product obtained upon mixing a sodium derivative of an alkanolamine with at least two other components B and C as described herein.

In fact, in many instances, the sodium alkanolamine catalyst composition actually contributes other improvements and in the polymerization of ethylene where the formation of such undesirable byproducts is not such a great problem as with propylene, etc., it is found that the sodium alkanolamine catalyst composition is beneficial in increasing the rate of polymeribation over that otherwise experienced.

The sodium alkanolamines which have been found particularly useful reagents in preparing the catalyst compositions of this invention are those derived from alkanolamines having at least two hydroxy groups present in the molecule and having the nitrogen atom in the amine at least disubstituted and preferably trisubstituted. It is generally preferred to have not more than three carbon atoms separating a hydroxy group from an amino group. Advantageously, the hydroxy and amino groups are on adjacent carbon atoms. While sodium derivatives of monoalkanolamines have been found to give satisfactory results, it is preferred to use sodium derivatives of dialkanolamines and advantageously trialkanolamines. It is also advantageous to have not more than 60, preferably not more than 20 carbon atoms in such a compound.

In such compounds alkoxy and acyloxy radicals can also be present as illustrated hereinafter. Apparently such groups do not interfere with the desired effect.

The exact chemical structure of the resultant catalyst composition is not known. However, while applicant does not wish to be restricted to any particular structure or formula of the resultant product, it is apparent from the nature and activity of the composition that the sodium alkanolamine undergoes reaction with the other components. Moreover, in view of the reactive nature of these components, no particular reaction conditions are required to promote this reaction. Reaction occurs merely upon mixing the components under anhydrous conditions even at room temperature and at even lower temperatures. However, it is preferred to use room temperature, or ambient temperature, or whatever temperature is convenient.

Typical alkanolamines that can be used for preparing such sodium derivatives include but are not restricted to the following:

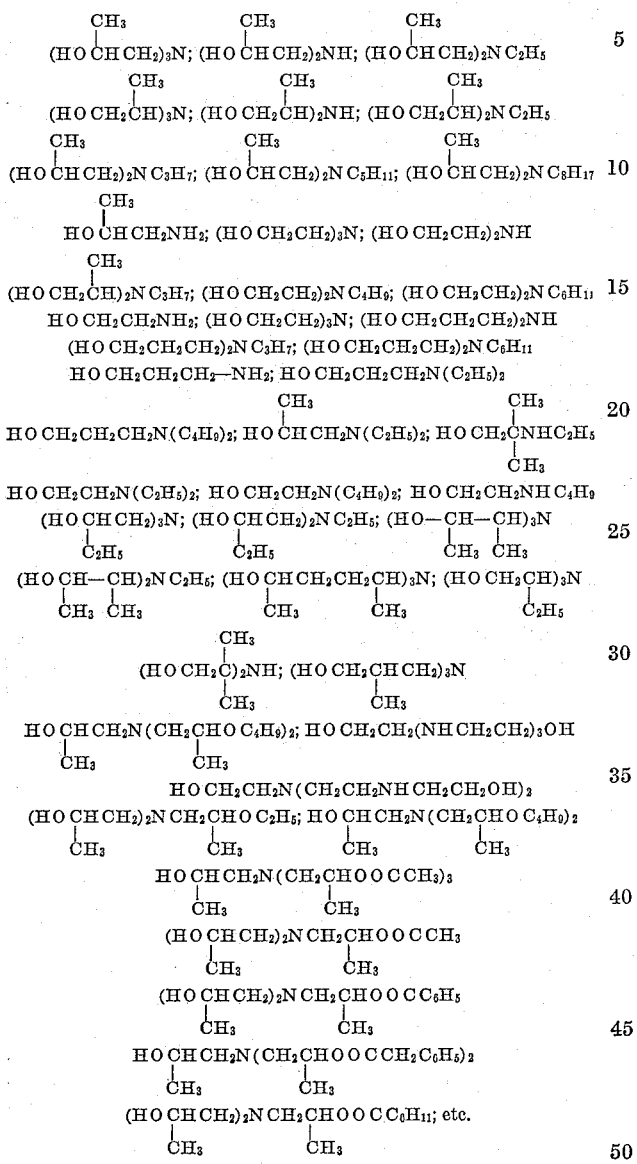

Sodium alkanolamines suitable for the above purpose are new chemical compounds of the formula NaO—Z—NR$_2$ wherein Z is a divalent aliphatic hydrocarbon radical of no more than 30 carbon atoms and derivatives thereof in which the derivative groups are each selected from the class consisting of OR', ONa and NR$_2$" groups and there are at least 2 and no more than 4 carbon atoms between said valencies, R' represents a radical selected from the class of hydrogen, alkyl and acyl radicals advantageously having no more than 20, preferably no more than 8 carbon atoms therein, R represents a radical of the class consisting of hydrogen, alkyl radicals of no more than 20 carbon atoms and derivatives of said alkyl radicals in which the derivative groups are each selected from the class consisting of OR', ONa and NR$_2$" groups, R" represents hydrogen or an alkyl radical or a derivative of said alkyl radical in which each derivative radical is hydrogen or OR', ONa or NR$_2$'", and R'" is either hydrogen or an alkyl radical, the alkyl radicals represented by R, R" and R'" each having no more than 20 carbon atoms, and in said compound the total number of carbon atoms being no more than 60, preferably no more than 20, the number of sodium atoms and nitrogen atoms each being no more than 3, and the number of oxygen atoms being no more than 6. For use in the catalyst systems of this invention, the compounds advantageously have no more than 2 and preferably no more than 1 sodium atom per molecule.

Typical sodium alkanolamine compounds of this invention include but are not restricted to the following:

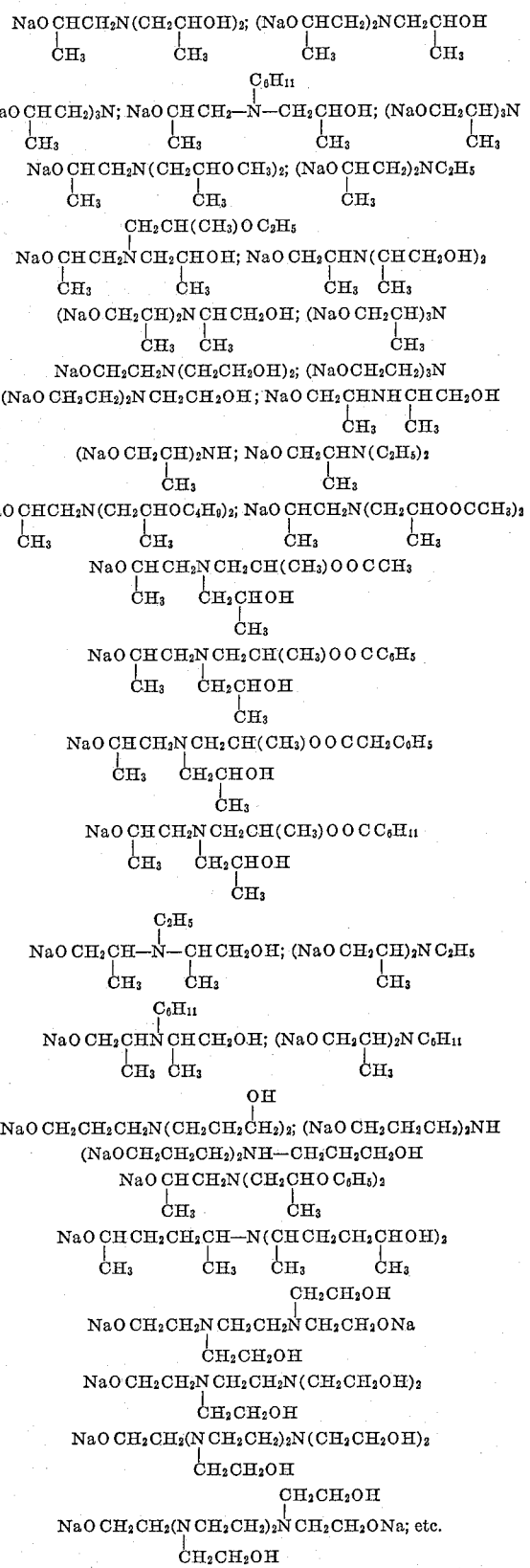

It will be noted that some of the above compounds have alkoxy or acyloxy groups. These compounds correspond to alkanolamines having a plurality of hydroxy groups in which one or more of the hydroxy groups have been converted in part to the alkoxy or acyloxy derivatives, preferably before the sodium is attached. While it is preferred that the hydroxy groups are unsubstituted, such substitution does not interfere with the practice of this invention provided that there are sufficient hydroxy groups free for the desired degree of sodium substitution or the substituted groups are easily replaced by the sodium.

In cases where compounds such as aluminum trialkyls are mixed with the sodium alkanolamines it is contemplated that aluminum replaces some of these substituent groups in forming desirable catalyst components. It is also possible to start with completely substituted alkanolamines such as the triacetate of triisopropanolamine and to introduce the sodium by reaction with sodium hydride and thereby replace one or more of the acetyl groups by sodium. In such case, the remaining acetyl groups are still susceptible to replacement by aluminum upon subsequent mixing with an aluminum trialkyl.

The sodium alkanolamine compounds of this invention are new compounds which can be prepared by reacting the appropriate alkanolamine with approximately the stoichiometric amount, advantageously a slight excess, of sodium hydroxide to give the desired degree of substitution, advantageously in the presence of a solvent or suspension medium capable of forming an azeotrope with the water formed as a byproduct and thereby removing such water by refluxing and separating the water from the condensate. Such azeotrope formers are xylene, toluene, benzene, etc. The refluxing is conducted until approximately the theoretical amount of water is separated.

As described more fully hereinafter, the component B used as a reagent in preparing the catalyst composition of this invention is a compound of a metal of the periodic groups IV(b), V(b), VI(b), VIII and manganese, preferably a salt, e.g. halide, oxyhalide, etc., esters, e.g. acetylacetonate, etc., or oxide, alcoholate, etc.

Also as described more fully hereinafter, the component C used as a reagent in preparing the catalyst composition of this invention is a metal of periodic groups I, II, III, IV(b), V(b) and VI(b) or a derivative of such a metal in which each derivative group is selected from the class consisting of hydrogen and hydrocarbon groups.

However, a particularly suitable heterogeneous catalyst system of this invention is one using $TiCl_3$, preferably in the alpha form, as component B, and an aluminum trialkyl, such as aluminum triethyl, as component C. In such a catalyst system, it is found desirable to have an Al-Ti ratio of approximately 1.5–10 moles of aluminum compound per mole of Ti compound. A particularly suitable ratio is 2 moles of aluminum compound per mole of titanium compound. In this and other catalyst compositions of this invention, it is found advantageous to use 0.1–0.6 mole, preferably 0.2–0.4 mole, of sodium alkanolamine per mole of titanium compound.

It has been found that those catalyst compositions of this invention which give increased yields very often produce such a fast polymerization rate that the temperature is more difficult to maintain. Moreover, it is found that the molecular weight of polymers made with these systems is generally higher than that obtained when the same conditions are maintained with other, known catalyst systems. This is particularly true at higher polymerization temperatures.

Generally, the polymerizations of this invention can be conducted in a rather broad temperature range, namely, from about room temperature to about 250° C. preferably in the range of 115–150° C. However, improved effects of this catalyst system are observed at temperatures even below room temperature.

Pressures ranging from atmospheric up to 20,000 lbs. per square inch can be used, although it is generally more convenient to operate in the range of atmospheric pressure up to 500 p.s.i. depending upon the particular olefinic material used and whatever other conditions are suitable for the reaction.

In determining the amount of atactic polymer present in a particular polymerization product, it has been found that the determination is more accurate when the polymerization reaction mass is allowed to cool slowly so as to precipitate the polymer in very fine particles. The following procedure is found to be the most suitable. After the polymerization is completed, water is added to the reactor by using the pressure of the propylene (or whatever other gas is being used) in order to push the water into the reactor. The water serves to inactivate the catalyst, and then the reaction mass is allowed to cool as slowly as possible overnight. As a result, the polymer is precipitated in a fine, granular form. To this is added 200 ml. of additional xylene. The resulting mass is thoroughly slurried, and then a small portion of the xylene, about 80–90 ml. is then filtered off. Twenty-five ml. of this filtrate is treated with 25 ml. isopropanol and allowed to stand for thirty minutes. This solution is passed through a coarse filter paper to remove precipitated wax. Twenty ml. of the filtrate is evaporated to dryness and the residue weighed. From the weight of this residue the corresponding grease fraction in the entire solution is calculated. The total xylene-soluble portion of the entire solution is determined by the evaporation af an aliquot of the original untreated xylene filtrate. The amount of wax is determined by the difference between the total xylene-soluble portion and the grease portion as calculated above. Where the respective grease and wax portions are not to be determined individually, the total xylene-soluble portion is easily determined by evaporation of an aliquot of the original untreated xylene filtrate. Both the grease and wax portions as well as the entire atactic byproduct is reduced by the improvement of this invention.

The polymerizable monomers that can be used in the practice of this invention are primarily olefins and various derivatives thereof. The derivative groups are cycloaliphatic hydrocarbon radicals, and aromatic radicals in which the aromatic nucleus can be hydrocarbon-substituted and halogen-substituted. These monomers have an ethylenic group of the formula $CH_2=CH-$ therein. These compounds are sometimes referred to herein as olefinic compounds. Preferably these compounds have no more than about 12 carbon atoms therein. Copolymerizations can be conducted in accordance with this process, but it is desirable that the comonomers are likewise free of polar groups other than halogen atoms attached to aromatic nuclei. Preferred comonomers are those of the same type described above.

Typical olefinic compounds that can be used in the practice of this invention include, but are not restricted to the following: ethylene, propylene, butene-1, n-pentene-1, 3-methyl-butene-1, 4-methyl-pentene-1, hexene-1, octene-1, butadiene-1,3, isoprene, hexadiene-1,5, vinyl cyclohexane vinyl cyclohexene, vinyl cyclopentane, vinyl methylcyclohexane, styrene, vinyl toluene, ethyl styrene, isopropyl styrene, butyl styrene, hexyl styrene, dimethyl styrene, diethyl styrene, vinyl diphenyl, vinyl naphthalene, vinyl methylnaphthalene, ar-chloro-styrene, ar-dichloro styrene, ar-bromo styrene, ar-iodo styrene, ar-fluoro styrene, vinyl ar-chloro-naphthalene, vinyl methyldiphenyl, vinyl ar-chloro-diphenyl, etc.

The practice of this invention is best illustrated by the following examples. The techniques and conditions normally used in heterogeneous catalyst systems are suitable for the practice of this invention. These examples are given merely by way of illustration and are not intended to limit the scope of the invention in any way nor the manner in which the invention can be practiced. Unless specifically indicated otherwise, parts and percentages are given as parts and percentages by weight. Throughout the specification, where reference is made to "polymers" and "polymerization," it is intended that these terms embrace "copolymers" and "copolymerization" unless otherwise indicated.

Example I

To a flask equipped with stirrer, reflux condenser, and a separator adapted to collect reflux condensate and effect the separation of a water layer therefrom, is added 200 parts of xylene, 19.1 parts of triisopropanolamine and 4 parts of sodium hydroxide. This mixture is heated to and maintained at reflux temperature for a period of approximately 2 hours, at which time substantially all of the water formed during the reaction has been separated. The monosodium derivative of triisopropanolamine which is formed has the formula

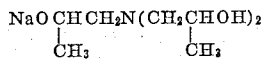

This compound is separated from the xylene solvent by cooling the xylene and seeding with similar crystals. Analysis of this compound shows values which are in close agreement with the theoretical percentages of Na, C, H, N and O in monosodium triisopropanolamine.

The corresponding disubstituted product having the formula

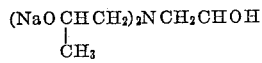

and the corresponding trisubstituted compound,

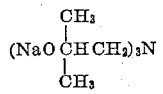

are prepared by using 8 and 12 parts respectively of the sodium hydroxide in the above procedure.

By substituting an equivalent amount of other alkanolamines, such as indicated above, in place of the triisopropanolamine in the above procedures, the corresponding sodium derivatives are prepared. For example, by substituting triethanolamine, diethanolamine, diisopropanolamine, ethyl diisopropanolamine, diethyl isopropanolamine, ethyl diethanolamine, etc., the corresponding derivatives of this invention are prepared, namely:

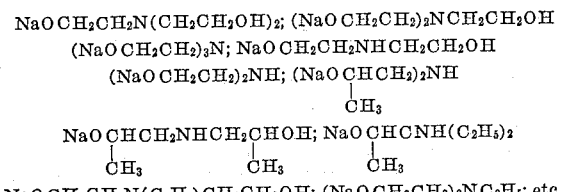

By using the appropriate alkanolamine, including the alkyl or acyl substituted derivatives, with approximately the stoichiometric amount of sodium hydroxide to give the desired degree of substitution, the various compounds of this invention are prepared by the above procedure.

Example II

A small pressure reactor equipped with an inlet and a means for maintaining constant temperature is purged of atmosphere by sweeping out with oxygen-free nitrogen. Then to the reactor is added 200 milliliters of distilled, dry paraxylene, 0.5 millimole of the monosodium derivative of triisopropanolamine and then 2 millimoles of aluminum triethyl and 1 millimole of $TiCl_3$ of a highly crystalline alpha type of large crystallite size (+60 mesh). This $TiCl_3$ is a commercially available type made by hydrogen reduction of $TiCl_4$, and activated by grinding. The resultant product is a catalyst composition of this invention. This is heated to 120° C. and then pure dry propylene is admitted to the reactor and maintained at a pressure of 120–130 p.s.i.g. After 2.5 hours, the catalyst is deactivated by the the addition of 5 milliliters of water and the reaction mass is allowed to cool slowly overnight. The solid polymer precipitate is filtered from the solvent and washed with a small portion of xylene, which wash xylene is added to the original filtrate. By evaporating an aliquot portion of the combined xylene filtrate and wash, the xylene-soluble portion or atactic byproduct fraction is determined.

A yield of over 400 grams of insoluble polymer (average mol. wt. above 500,000) is obtained per gram of $TiCl_3$ used in comparison with approximately 125 grams obtained when a corresponding catalyst composition is used in which the sodium alkanolamine is not reacted. Moreover the above procedure reduces the xylene-soluble portion to 7% based on the total polymer yield whereas the control run without the sodium compound gives 12%.

When the above procedure is repeated a number of times varying the mole ratio of Ti-Al-Na-N to 4-10-1-1; 2.5-7.5-1-1; 1.5-5-1-1 and 4-8-1-1, respectively, similar improvements are noted in total yield of polymer and in the reduction of the percentage of atactic polymer byproduct with accompanying improvements in tensile yield and tensile modulus.

Example III

The procedure of Example II is repeated a number of times reacting the following components for preparation of the new catalyst compositions in place of the A, B and C components used in Example II and using similar amounts and mole ratio of catalyst components as used in Example II:

(a) $TiCl_4$+$AlEt_3$+NaTIPA
(b) $TiCl_3$+$AlBu_3$+NaTIPA
(c) $ZrCl_4$+$AlEt_3$+NaTIPA
(d) $ZrCl_3$+$AlBu_3$+NaTIPA
(e) $VCl_4$+$AlEt_3$+disodium triisopropanolamine
(f) $VCl_3$+$AlEt_3$+monosodium triethanolamine
(g) $VOCl_3$+$AlEt_3$+monosodium diisopropanolamine
(h) $TiBr_3$+$AlEt_3$+monosodium diethanolamine
(i) $TiCl_3$+$Al(CH_2C_6H_{11})_3$+NaTIPA
(j) $TiCl_3$+$Al(CH_2C_6H_{11})_3$+NaTIPA
(k) $TiCl_3$+$AlEt_3$+monosodium triethanolamine In each case a decrease is noted in the amount of xylene-soluble polymer as compared to the amount produced in corresponding runs in which the monosodium triisopropanolamine is omitted.

Improvements are likewise noted when the procedure of Example II is repeated a number of times using catalyst compositions of this invention prepared by reacting monosodium tri-isopropanolamine with $TiCl_4$ and $TiCl_3$, respectively, each activated by Na, Li, K, Be, Co, Mg, Cd, Ba, Zn, Hg, Al, Ti, Zr, Hf, Th, V, Nb, Ta, Cr, Mo and W, respectively. In each case the amount of atactic polymer is reduced when a catalyst is used in which the sodium triisopropanolamine is reacted to prepare the catalyst composition as compared to polymerizations using a corresponding catalyst composition in which the sodium alkanolamine is not reacted.

Example IV

The procedure of Example II is repeated a number of times using independently, in place of the propylene, equivalent amounts of the following olefinic compounds, in each case improvements being noted in the polymerization of the olefinic compounds, the polymerization rate being increased with respect to ethylene and both polymerization rate and a decreased amount of atactic byproduct being noted with respect to the other olefinic compounds:

(a) Ethylene;
(b) Butene-1;
(c) 3-Me-butene-1;
(d) Butadiene-1,3;
(e) Isoprene;
(f) Styrene;
(g) Vinyl xylene;
(h) p-Cl-Styrene;
(i) Vinyl naphthalene;

(j) Vinyl diphenyl;
(k) Vinyl toluene;
(l) 50–50 mole mixture of butadiene and styrene;
(m) 75-25 mole mixture of propylene and styrene;
(n) n-Octene-1.

While xylene has been specified as a preferred solvent and is used throughout the preceding examples, other solvents suitable for use in heterogeneous catalyst systems for polymerization of olefinic compounds can be used. In such cases similar improvements in reduction of the amount of atactic polymer is effected even though reference is made to xylene-soluble products. This designation is merely to identity the atactic polymer which it is desired to avoid in the polymerization of the olefinic compound. This is illustrated by repeating the procedure of Example II using, in place of the xylene, various solvents such as benzene, toluene, cyclohexane and hexane. In each case similar improvements are noted in the reduction of the atactic byproduct formed.

Other typical catalyst compositions include, but are not restricted to the following in which the recited components are reacted to produce the improved catalysts of this invention.

(1) (A) A sodium alkanolamine as described herein, (B) the periodic group IV(b), V(b) and VI(b) metal halides of the type represented by titanium tetrachloride, titanium trichloride, titanium dichloride, zirconium tetrachloride, zirconium trichloride, etc., and (C) an aluminum trialkyl, e.g. triethylaluminum, triisobutylaluminum, etc.;

(2) (A) A sodium alkanolamine, (B) a periodic group IV inorganic halide (such as titanium tetrachloride); (C) a low valence metal selected from the group consisting of alkali metals, beryllium, magnesium, zinc, cadmium, mercury, aluminum, gallium, indium, and thallium, and (D) an organic halide such as ethyl bromide.

(3) (A) A sodium alkanolamine, (B) a group IV halide, for example, titanium tetrachloride; and (C) a low valence metal such as identified in 2, for example, sodium or magnesium.

(4) (A) A sodium alkanolamine, (B) titanium hydride; (C) an organometal compound exemplified by aluminum alkyl halide.

(5) (A) A sodium alkanolamine, (B) titanium dioxide; and (C) an organometal compound such as trialkylaluminum and aluminum alkyl chlorides.

(6) (A) A sodium alkanolamine, (B) a molybdenum pentachloride, and (C) an aluminum organometal compound exemplified by triethylaluminum and ethylaluminum dichloride.

(7) (A) A sodium alkanolamine, (B) a complex metal halide exemplified by potassium fluotitanate, and (C) an organometal compound exemplified by triethylaluminum and diethylaluminum chloride.

(8) (A) A sodium alkanolamine, (B) an oxide of molybdenum, an alkali metal or an ammonium molybdate, and (C) triisobutylaluminum and isobutylaluminum dichloride.

(9) (A) A sodium alkanolamine, (B) a derivative of iridium, platinum, and osmium selected from the group consisting of halides, oxides and complex compounds of iridium, platinum and osmium, said complex compounds corresponding to the formula $M_xM'X_y$, wherein M is an alkali metal or an ammonium radical, M' is iridium, platinum or osmium, X is a halogen, and $y$ is at least 1 and the sum of $x$ and $y$ is equal to the valence of M', (C) a metallic organic compound exemplified by triethylaluminum, or ethylaluminum sequichloride.

(10) (A) A sodium alkanolamine, (B) at least one derivative selected from the group consisting of oxides, halides, and oxyhalides of vanadium and complex salts of said halides with a member selected from the group consisting of ammonium halide and an alkali metal halide, (C) an organometal compound exemplified by triethylaluminum.

(11) (A) A sodium alkanolamine, (B) a derivative of a group VI metal selected from the group consisting of halides, oxyhalides, hydroxyhalides, oxyhydroxyhalides of a metal of a group consisting of molybdenum, tungsten, uranium, selenium, tellurium, and polonium, and complex salts of said halides and said oxyhalides with a member selected from the group consisting of halides of sodium, potassium, lithium, rubidium, cesium and ammonia, (C) an organometal compound exemplified by triethylaluminum and ethylaluminum dichloride.

(12) (A) A sodium alkanolamine, (B) a chromylhalide, and (C) at least one of the following: (a) a metal hydride or an organometal compound, (b) an organometal halide, and (c) a mixture of an organic halide and a metal, for example, chromyl chloride, ethylbromide and magnesium.

(13) (A) A sodium alkanolamine, (B) a titanium derivative such as butyl titanate, and (C) a complex hydride such as lithium aluminum hydride (C') a halide of aluminum such as aluminum chloride.

(14) (A) A sodium alkanolamine, (B) at least one halide of titanium, zirconium or hafnium, for example zirconium tetrachloride, and (C) at least one hydride of lithium, sodium, potassium, rubidium, cesium, magnesium, calcium, strontium, barium, lanthanum or thorium.

(15) (A) A sodium alkanolamine, (B) a member selected from the group consisting of halides of titanium, zirconium, vanadium, and molybdenum, oxyhalides of titanium, zirconium, vanadium, molybdenum and chromium, and complex salts of said halides and oxyhalides with a member selected from the group consisting of halides of the alkali metals and ammonia, for example, titanium tetrachloride, and (C) a hydrocarbon derivative of one of the metals, zinc, cadmium, mercury and magnesium, such as diethyl zinc.

(16) (A) A sodium alkanolamine, (B) at least one of the following: an organometal halide, a mixture of an organic halide and a metal and a complex hydride, and (C) an organo derivative of a group IV(b) metal, (D) a hydride or organo compound of a metal of groups II to VIII, inclusive.

(17) (A) A sodium alkanolamine, (B) a tri- or tetrahalide of titanium, zirconium, hafnium and germanium, (C) an organophosphorus-containing compound such as triphenyl phosphine, and (D) at least one of the following, an organometal halide, a mixture of an organic halide and a metal and a complex hydride.

(18) (A) A sodium alkanolamine, (B) a tri- or tetrahalide of titanium, zirconium, hafnium and germanium, (C) a peroxide of the formula R'OOR' where R' is hydrogen, alkyl, aralkyl, cycloalkyl, acyl, alkyne, or aryl, such as benzoyl peroxide, and (D) at least one of the following: an organometal halide, a mixture of an organic halide and a metal and a complex hydride, for example, ethylaluminum sesquichloride.

(19) (A) A sodium alkanolamine, (B) a tri- or tetrahalide of titanium, zirconium, hafnium and germanium, (C) a metal alkoxide, such as aluminum ethylate, and (D) at least one of the following: an organometal halide, a mixture of an organic halide and a metal, or a complex hydride, such as for example, ethylaluminum sesquichloride.

(20) (A) A sodium alkanolamine, (B) a halide of titanium, zirconium, hafnium, or germanium, for example, titanium tetrachloride, (C) a hydride selected from the group consisting of hydrides of aluminum, gallium, indium and thallium and complexes of said hydrides with alkali metal hydrides, lithium aluminum hydride, and (D) an organic halide such as ethyl bromide.

(21) (A) A sodium alkanolamine, (B) a halide of titanium, zirconium, hafnium, or germanium, (C) a carbide or acetylenic compound such as copper acetylide, and (D) at least one of the following: an organometal halide, a mixture of an organic halide and a free metal, and a complex hydride, such as for example, ethylaluminum sesquichloride.

(22) (A) A sodium alkanolamine, (B) a halide of a group IV(b), V(b) or VI(b) metal, such as $TiCl_4$, $TiCl_3$, $TiCl_2$, $ZrCl_4$, etc., and (C) a metal of group IV(b), V(b) or VI(b), e.g. Ti, Zr, Hf, V, Nb, Ta, Zr, Mo, and W, or an alkyl, hydride, alcoholate or ester derivative thereof, such as Ti, Zr, $TiEt_4$, $TiH_2$ and $Ti(OCH_3)_4$.

Particularly preferred heterogeneous catalyst systems suitable for the practice of this invention are compositions resulting from the mixture comprising at least the three essential components, (A) a sodium alkanolamine as described herein, (B) a compound of a metal selected from the group consisting of periodic groups IV(b), V(b), VI(b), VIII and manganese, preferably a salt, e.g. halide, oxyhalide, etc., or ester, such as acetylacetonate, etc., or oxide, or alcoholate, and (C) another of said components being selected from the class consisting of organometals, metal hydrides, and metals of periodic groups I, II, III and IV(b), V(b) and VI(b). For example, component A can be any of the various alkanolamines enumerated herein. Component B is a halide, alcoholate, oxide or ester of Ti, Zr, Hf, Th, V, Nb, Ta, Cr, Mo, W, Fe, Co, Ni, and Mn. Component C is Na, Li, K, Be, Ca, Mg, Cd, Ba, Zn, Hg, Al, Sc, Ti, Zr, Hf, Th, V, Nb, Ta, Cr, Mo or W, or a derivative of such a metal in which the derivative groups are each selected from the class consisting of hydrogen and hydrocarbon radicals, such as alkyl, cycloalkyl, alkenyl, cycloalkenyl and aryl radicals, the hydrocarbon portions of said radicals each having no more than 10 carbon atoms, preferably no more than 6 carbon atoms.

Typical examples of component B are: $TiCl_4$, $TiCl_3$, $TiCl_2$, $TiBr_3$, $TiF_3$, $TiI_4$, $Ti(OC_4H_9)_4$, $Ti(OC_6H_5)_4$, $Ti(OCl)_2Cl_2$, titanium acetylacetonate, $TiCl_2(OCH_3)_2$, zirconium acetylacetonate, vanadium oxyacetylacetonate, $NbCl_3$, $TaCl_4$, $CrCl_2$, chromium acetylacetonate, $MoCl_5$, $WCl_6$, $MnCl_2$, $NiCl_2$, $FeCl_2$, $FeCl_3$, etc.

Typical examples of component C are: the various metals themselves and derivatives such as $Al(C_2H_5)_3$, $Al(C_4H_9)_3$, $AlH(C_2H_5)_2$, $Al(C_2H_5)_2C_6H_{11}$, $Al(C_5H_7)_3$, $Al(CH_2CH=CH_2)_3$, $AlH_3$, $LiC_2H_5$, $NaC_4H_9$, $KC_3H_7$, $BE(C_2H_5)_2$, $Ca(C_3H_7)_2$, $Zn(C_3H_7)_2$, $Mg(C_2H_5)_2$, $NaC_2H_5$, $Ba(C_2H_5)_2$, $BeH_2$, $LiC_4H_9$, $NaC_6H_5$, $MgH_2$, $LiAl(C_2H_5)_4$, $LiAlH_4$, $NaAl(C_2H_5)_4$, $Mg(CH_3)_2$, $Mg(C_2H_5)_2$, $Mg(C_4H_9)Cl$, $Mg(C_6H_5)Br$, $Al(CH_3)_2Cl$, $Al(C_2H_5)_2Cl$, $Al(C_3H_7)Cl_2$, $Al(C_2H_5)_2H$, etc.

Most particularly preferred are catalyst combinations of a sodium alkanolamine as described herein, with a titanium halide having a valency of at least 2, advantageously a chloride, e.g., $TiCl_2$, $TiCl_3$, etc., and an aluminum trialkyl, preferably one in which the alkyl group has no more than 6 carbon atoms such as $Al(C_2H_5)_3$, $Al(CH_3)_3$, $Al(C_3H_7)_3$, $Al(C_4H_9)_3$, etc. Particularly suitable are the α and γ forms of titanium trichloride.

In the above catalyst systems component C is advantageously used in an amount 1.5–10 mole proportions per mole of component B, preferably approximately 2 moles of component C per mole of component B. For example, in a preferred catalyst system, 1.5–10 moles of aluminum trialkyl, preferably 2 moles, is used per mole of $TiCl_3$, preferably the alpha form of the $TiCl_3$ which is the form used in Example II.

The sodium alkanolamine is advantageously used in an amount of 0.05–0.77 mole preferably 0.2–0.4 mole of alkanolamine per mole of component B. For example, 0.05–0.77 mole, preferably 0.2–0.4 mole of monosodium triisopropanolamine, is advantageously used per mole of $TiCl_3$.

The procedure of Example I is the preferred method for the preparation of the sodium alkanolamine compounds of this invention starting with an alkanolamine compound of the formula $R'OZNR_2$, preferably $HOZNR_2$, wherein the symbols have the meanings described above. However, other methods, such as indicated above, can also be used. Moreover, various modifications of the Example I procedure can also be used. For example, in removing the water or other byproduct formed by the condensation reaction of the sodium starting compound with the alkanolamine compound, the water, etc., can be removed from the reaction mass also by blowing an inert gas through the mass, by reducing the pressure, absorbing the water on a molecular sieve, circulating through silica gel, etc.

While certain features of this invention have been described in detail with respect to various embodiments thereof, it will, of course, be apparent that other modifications can be made within the spirit and scope of this invention and it is not intended to limit the invention to the exact details shown above except insofar as they are defined in the following claims.

The invention claimed is:

1. A composition suitable for use as a polymerization catalyst comprising the product obtained upon mixing under anhydrous conditions:
   (A) a sodium derivative of an alkanolamine of no more than 60 carbon atoms having the formula $NaOZNR_2$ wherein Z is a divalent radical selected from the class consisting of divalent aliphatic hydrocarbon radicals of no more than 30 carbon atoms and derivatives thereof in which the derivative groups are each selected from the class consisting of OR', ONa, and $NR_2''$ groups, said divalent radical having at least 2 and no more than 4 carbon atoms between said valencies; R' represents a radical selected from the class of hydrogen, alkyl and acyl radicals having no more than 20 carbon atoms therein; R represents a radical of the class consisting of hydrogen, alkyl radicals and derivatives of said alkyl radicals in which the derivative radicals are each selected from the class consisting of OR', ONa, and $NR_2''$ radicals; R" represents a radical selected from the class consisting of hydrogen, alkyl radicals and derivatives of alkyl radicals in which the derivative radicals are each selected from the class consisting of OR', ONa and $NR_2'''$ radicals; and R''' represents a radical from the class consisting of hydrogen and alkyl radicals; said alkyl radicals represented by R, R" and R''' each having no more than 20 carbon atoms therein, in said compound the total number of carbon atoms being no more than 60, the number of sodium atoms and nitrogen atoms each being no more than 3, and the number of oxygen atoms being no more than 6;
   (B) a compound selected from the class consisting of halides, oxides, alcoholates and esters of metals of the periodic groups IV(b), V(b) VI(b), VIII and manganese; and
   (C) a component selected from the class consisting of metals of periodic groups I, II, III, IV(b), V(b) and VI(b) and derivatives thereof in which each derivative group is selected from the class consisting of hydrogen and hydrocarbon radicals.

2. A composition of claim 1, in which said sodium compound is monosodium triisopropanolamine.

3. A composition of claim 1, in which said sodium compound is monosodium triethanolamine.

4. A composition of claim 1, in which said sodium compound is sodium triisopropanolamine.

5. A composition of claim 1, in which said sodium compound is monosodium diisopropanolamine.

6. A composition of claim 1, in which said sodium compound is monosodium ethyl-diisopropanolamine.

7. A composition of claim 1, in which said component B is a titanium chloride in which the titanium has a valency of at least 2, and said component C is an aluminum trialkyl in which said alkyl radicals have no more than 6 carbon atoms.

8. A composition of claim 7, in which said titanium chloride is $TiCl_3$.

9. A composition of claim 8, in which said aluminum trialkyl is used in a proportion of 1.5–10 moles per mole of TiCl₃, and said sodium alkanolamine is used in the proportion of 0.05–0.77 mole per mole of TiCl₃.

10. A composition of claim 9, in which said sodium alkanolamine is monosodium triisopropanolamine.

11. A composition of claim 10, in which said monosodium triisopropanolamine is used in the proportion of 0.2–0.4 mole per mole of TiCl₃.

12. A polymerization process comprising the step of polymerizing an olefinic compound having no more than 30 carbon atoms therein selected from the class consisting of olefins having a CH₂=CH— group and derivatives thereof in which each derivative group is selected from the class consisting of cycloalkyl, aryl and haloaryl groups, in which haloaryl groups each halogen atom is attached directly to the aromatic nucleus of the aryl group, at a temperature of room temperature to 250° C., at a pressure of atmospheric pressure to 20,000 pounds per square inch, in the presence of a catalyst composition comprising the reaction product obtained upon mixing the following three components:

(A) a sodium derivative of an alkanolamine of no more than 60 carbon atoms having the formula NaOZNR₂ wherein Z is a divalent radical selected from the class consisting of divalent aliphatic hydrocarbon radicals of no more than 30 carbon atoms and derivatives thereof in which the derivative radicals are each selected from the class consisting of OR′, ONa, and NR₂″ radicals, said divalent radical having at least 2 and no more than 4 carbon atoms between said valencies; R′ represents a radical selected from the class consisting of hydrogen, alkyl and acyl radicals having no more than 20 carbon atoms therein; R represents a radical of the class consisting of hydrogen, alkyl radicals and derivatives of alkyl radicals in which the derivative radicals are each selected from the class consisting of OR′, ONa, and NR₂″ radicals; R″ represents a radical selected from the class consisting of hydrogen, alkyl radicals and derivatives of alkyl radicals in which the derivative radicals are each selected from the class consisting of OR′, ONa, and NR‴ radicals; and R‴ represents a radical selected from the class consisting of hydrogen and alkyl radicals; said alkyl radicals represented by R, R″ and R‴ each having no more than 20 carbon atoms therein, the total number of carbon atoms in said compound being no more than 60, the number of soduim atoms and nitrogen atoms each being no more than 3, and the number of oxygen atoms being no more than 6;

(B) a compound selected from the class consisting of halides, oxides, alcoholates and esters of metals of the periodic groups IV(b), V(b), VI(b), VIII and manganese; and (C) a component selected from the class consisting of metals of periodic groups I, II, III, IV(b), V(b) and VI(b) and derivatives thereof in which each derivative group is selected from the class consisting of hydrogen and hydrocarbon radicals.

13. The process of claim 12, in which said sodium compound is monosodium triisopropanolamine.

14. The process of claim 12, in which said sodium compound is monosodium triethanolamine.

15. The process of claim 12, in which said sodium compound is sodium triisopropanolamine.

16. The process of claim 12, in which said sodium compound is monosodium diisopropanolamine.

17. The process of claim 12, in which said sodium compound is monosodium ethyl-diisopropanolamine.

18. The process of claim 12, in which said temperature is 115–150° C., and said pressure is in the range of atmospheric pressure to 500 pounds per square inch.

19. The process of claim 18, in which said catalyst comprises a titanium chloride in which the titanium has a valency of at least 2, and an aluminum trialkyl in which said alkyl radicals have no more than 6 carbon atoms.

20. The process of claim 19, in which said titanium chloride is TiCl₃.

21. The process of claim 20, in which said aluminum trialkyl is present in a proportion of 1.5–10 moles per mole of TiCl₃, and said lithium alkanolamine is present in the proportion of 0.05–0.77 mole per mole of TiCl₃.

22. The process of claim 21, in which said sodium alkanolamine is monosodium triisopropanolamine.

23. The process of claim 22, in which said monosodium triisopropanolamine is present in the proportion of 0.2–0.4 mole per mole of TiCl₃.

24. The process of claim 23, in which said olefinic compound is propylene.

25. The process of claim 12, in which said olefinic compound is propylene, said component B is TiCl₃ and said component C is an aluminum trialkyl in which said alkyl groups each have no more than 6 carbon atoms.

26. The process of claim 25, in which said temperature is 115–150° C., and said pressure is in the range of atmospheric pressure to 500 pounds per square inch.

References Cited by the Examiner

UNITED STATES PATENTS

| | | | |
|---|---|---|---|
| 2,884,459 | 4/1959 | Kirkpatrick | 260—584 |
| 2,998,416 | 8/1961 | Mendel | 260—93.7 |
| 2,999,086 | 9/1961 | Fasce | 260—93.7 |
| 3,053,897 | 8/1962 | Clark | 260—584 |

JOSEPH L. SCHOFER, *Primary Examiner.*

F. L. DENSON, *Assistant Examiner.*